Patented Aug. 21, 1945

2,383,284

UNITED STATES PATENT OFFICE 2,383,284

LEAD PIGMENTS AND METHODS OF MAKING SAME

Louis E. Barton, Windsor, Conn.

No Drawing. Application February 24, 1944,
Serial No. 523,745

13 Claims. (Cl. 106—297)

My invention relates to the improvement of lead aluminate pigments and more particularly to the improvement of opaque white pigments consisting preponderantly of lead oxide, alumina and silica which I shall refer to in this application as lead alumino-silicates.

In my United States Patent 2,277,063 dated March 24, 1942, I have described a process of making lead aluminate pigments which in brief consists in heating a mixture of lead and aluminum oxides at suitable temperatures until they chemically combine in the solid phase to form white lead aluminate. The product so made, or after wet-milling and drying, may be used as pigment for paint and other purposes, but I have also disclosed, in my patent referred to, that if in the preparation of the lead aluminate either aluminum hydrate or gamma aluminum oxide is used the lead aluminate pigment will be relatively unstable. Such instability is shown by discoloration and excessive hydration when the pigment is long exposed to the action of water and by gradual decomposition and discoloration of the pigment when kept in storage.

In my United States Patent 2,273,825 dated February 24, 1942, I have disclosed a process of making stabilized lead aluminates which in brief consists in adding a small amount of silica to a mixture of such lead and aluminum compounds as will, upon heating, supply to the product only lead and aluminum oxides and then heating the mixture until the oxides chemically combine in the solid phase. The resulting white anhydrous lead aluminate containing silica or lead aluminosilicate is a stable white product which will not discolor upon treatment with water nor when kept in storage. It was further disclosed that the anhydrous product can, if desired, be treated with water to form a stable hydrated lead aluminate.

Though both white lead aluminate and white lead silicate pigments can be prepared by solid phase reaction, the preparation of lead pigments containing both alumina and silica (lead alumino-silicates) presents some difficulties and limitations. Such white lead aluminates as described in my Patent 2,273,825, above referred to, containing up to 5% combined silica, are easily prepared. White lead alumino-silicate pigments containing 50% or more of alumina and silica can be made by solid phase reaction but such pigments, being low in lead oxide content, are too low in tinting strength and hiding power to function importantly as opaque white pigments for paint. Lead alumino-silicates contain higher percentages of lead oxide, for example, 65 to 70% PbO, and the balance alumina and silica will upon heating to suitable temperatures yield bright yellow pigments of fine soft texture the yellow color being persistently retained until the temperature reaches 700° C. and above, when the product finally acquires a white color but is then in a highly granular condition rendering it unsuitable as a pigment since even after milling its hiding power is very low. This will be shown by examples later.

In the patents referred to in the foregoing it has been disclosed and shown by examples that the lead aluminate products, whether hydrated or anhydrous, stable or unstable, have tinting strength and hiding power averaging in the order of white lead taken as standard 100 tinting strength and also that it is usually necessary to mill the product to develop full tinting strength and fineness of the pigment. The objectionable particle aggregation and low tinting strength is particularly apparent in the calcined products described in my Patent 2,273,825 before referred to, where silica has been used to stabilize the lead aluminate against discoloration by the action of water or during long storage. The tinting strength of such stabilized products will average below 100 compared with standard white lead. It is believed that the aggregation of particles and granular condition of lead aluminates after formation in the solid phase is the result of crystal growth during the heating, with the rate of such growth increasing with the calcination temperature. Calcining at very low temperatures yields products with softer texture and tends to improved tinting strength but the lower temperatures make necessary much longer heating resulting in reduced capacity of equipment and increased cost of operation.

I have discovered that if the lead aluminate or lead alumino-silicate is formed by solid phase reaction in the presence of lead sulphate, prepared as hereinafter described, the resulting product, consisting of lead aluminate or lead alumino-silicate and lead sulphate, is a very fine-grained pigment having a soft texture and greatly improved tinting strength and is easily dispersed in paint vehicles, either with or without the usual premilling of the pigment after the calcination step. This is true even though the medium and higher permissible temperatures are used in calcining. Furthermore, the presence of lead sulphate during the formation of the pigment appreciably accelerates the reaction and permits operation at lower temperatures, thus tending to economy in operation.

Briefly described, the preferred method of operating my process consists in intimately mixing a water-soluble sulphate with lead, aluminum and silicon compounds, whereby lead sulphate is formed by reaction of the soluble sulphate with the lead compound, and then heating the mixture until lead and aluminum oxides and silica chemically combine in the solid phase to form a lead alumino-silicate combined with lead sulphate. The reaction to form lead sulphate may take place between the lead compound and a solution of the sulphate or, if the charge is dry-mixed, by solid phase reaction in the early stages of heating; in either case forming the lead sulphate before the reaction to form lead alumino-silicate takes place.

While I prefer to operate the process as above outlined I can use separately prepared lead sulphates such as obtainable in the market or which can be easily prepared as will be shown by example later. Such separately prepared lead sulphates, though they improve the tinting strength, are not as highly effective in that respect as is lead sulphate formed in situ as before described, but the texture is greatly improved, yielding a fine soft pigment which is easily dispersed in paint vehicles.

I have furthermore discovered that the improvement in product and advantages in operation of process are appreciable regardless of the composition of the pigment, whether it be the type described in my Patent 2,273,825, before referred to, which contains small amounts of silica or the type before described, which is high in lead oxide, alumina and silica which has heretofore yielded only colored pigments or, if heated at higher temperatures, white products of granular texture and low tinting strength unsuitable as a pigment for paint.

Not all water-soluble sulphates are available in the process. For example, sodium sulphate reacts negligibly with lead oxide (PbO) in cold solution of the salt and the reaction of that salt to form lead sulphate in the solid phase during the subsequent heating is far from complete. Furthermore, the excess of reagent and by-product alkali hydrate must be washed out of the calcined product to avoid contamination of the pigment by water-soluble salts. I have found water-soluble sulphates, the solutions of which react completely with the solid lead compound to form lead sulphate, are available for my process and that such soluble sulphates will also react with the lead compound in the solid phase in case the charge is dry-mixed and then heated. I have found sulphuric acid, ammonium sulphate and magnesium sulphate are particularly suitable for my process. If magnesium sulphate is used the final pigment will contain an equivalent of magnesium oxide. The magnesia apparently is chemically combined with other constituents of the product, yielding a neutral pigment. Ammonium sulphate and sulphuric acid supply only sulphuric anhydride ($SO_3$) to the product but I prefer to use sulphuric acid as the soluble sulphate for economic reasons and commercial availability of the reagent.

As little as 0.5% of lead sulphate, introduced as described, is sufficient to assure a product of improved tinting strength, soft fine texture and easy dispersibility in vehicles but 5 to 10% of lead sulphate appears desirable to develop maximum tinting strength. However the lead sulphate can be used in any proportion desired as will be shown later by examples.

The chemical or physio-chemical reactions in the formation of my pigment products are not definitely known but it appears that the lead aluminum and silicon compounds are precoated with, or dispersed by, the lead sulphate, preventing grain growth during the heating. The lead sulphate also appears to promote intermediate reactions which accelerate the formation of lead alumino-silicate in the solid phase. The lead sulphate, pre-formed during the mixing or in the early stages of the subsequent heating, in either case in the presence of a large excess of lead oxide, may be a highly dispersed basic lead sulphate, but whatever its constitution or the reactions involved in its formation, the pre-formation of the lead sulphate, as described, is important in attaining the desired results.

I can make by my process lead alumino-silicates of any desired composition either subnormal, normal or basic as regards its proportions of lead oxide (PbO) to alumina and silica. Before giving examples of the operation of my process I shall give a general description of available materials, equipment and operations in the steps of the process.

As a source of aluminum oxide, I can use alumina ($Al_2O_3$) or any aluminum compound which upon heating yields aluminum oxide, such as aluminum hydrate or aluminum nitrate. As a source of silica I can use either the natural or artificially prepared material in either hydrous or anhydrous form. I can also use white clays, which are fairly free from discoloring impurities, to supply both alumina and silica. As a source of lead oxide, I can use the oxide as such, or any compound of lead that will yield the required oxide upon heating. For example, I may use either litharge (PbO), or red lead ($Pb_3O_4$), or lead peroxide ($PbO_2$), or white lead ($2PbCO_3PbH_2O_2$). To supply the water-soluble sulphate I can use sulphuric acid, ammonium sulphate, magnesium sulphate or other water-soluble sulphate which will react completely with lead oxide to form lead sulphate. If desired to add lead sulphate as such to the mixture it can be obtained in the market or prepared as later shown by example.

I mix the lead, aluminum and silicon compounds and the water-soluble sulphate, preferably by milling, to reduce particle size or aggregates and assure an intimate association of ingredients. The materials can be dry-milled but preferably I first wet-mill the lead, aluminum and silicon compounds together as a thick slurry, then add the sulphate as a solution and continue milling until the reaction to form lead sulphate is complete. The milling may be done in a batch or continuous type of mill; in either case I prefer a porcelain or silex lining to avoid contamination of materials. The slurry from the wet-mill may be dewatered if necessary as by settling and decantation and/or filtration. Any suitable equipment may be used, such as Dorr tanks and filter presses.

The wet pulp prepared as described, may be charged directly into the heating furnace or may be first dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. Whatever the type of furnace, means should be provided for control of temperature. In furnaces where products of combustion contact the charge a neutral or oxidizing flame should be maintained to avoid possible reduction of metallic oxides.

The time required in the calcining zone depends upon the temperature. The higher the temperature within the permissible range, of 400 to 850° C., the shorter the time. Within the permissible range indicated I prefer a temperature range of 400 to 800° C., depending on composition of product. The time required within the preferred temperature range will be indicated later by examples. The progress of the reaction may be judged by withdrawing a small sample from the furnace for observation. The lead alumino-silicates should be substantially white when the reaction is complete and should not acquire a darker color upon grinding the sample in an agate mortar.

If the lead alumino-silicates are prepared at suitable temperatures within the preferred range indicated, the calcined pigment will require no milling to prepare it for use with paint vehicles but the pigment may be milled if desired. Either dry or wet-milling methods may be used with or without air separation or wet classification respectively, thereby assuring uniformity of product. If wet-milling has been employed, the slurry is dewatered, dried, and if necessary passed through a disintegrator to break down lumps and aggregates. If the lead alumino-silicate pigment is wet-milled or otherwise treated with water the final product will be a hydrated pigment, the percentage of combined water depending upon the time treated with water as well as upon the type and composition of the pigment.

The examples in Tables I and II indicate the improvement in lead aluminates and lead alumino-silicates which results from my process. In all cases the materials for making the pigment products including the water-soluble sulphate were mixed by wet-milling. The water-soluble sulphate was in all cases ammonium sulphate except in Examples 5, 6, 7 and 8 in which sulphuric acid was used. The mixtures were dried or partially dried before calcining them. The analyses of the pigments, including the percentages of lead sulphate, are shown in column 2 of the tables.

Table I shows examples of lead alumino-silicates with the smaller percentages of silica required to stabilize them against discoloration by water, while Table II shows examples where larger percentages of silica are contained in the products.

Example 6 in Table I shows that only small amounts of lead sulphate are needed to improve tinting strength, give soft texture and, as experience has shown, good dispersibility in vehicles. This is also shown by Examples 22 and 23 given later. For development of greatly improved tinting strength 5 to 10% of lead sulphate is indicated by comparison of the tinting strengths shown in Examples 3 to 5 with tinting strengths shown in Examples 1 and 2 where no lead sulphate was used. Examples 7 and 8 show that very large percentages of lead sulphate in the pigment result in no greater improvement in tinting strength than obtainable with 5 to 10%, however, the products are excellent white pigments having greatly improved tinting strength notwithstanding that the pure lead sulphate of commerce, or that prepared as described later in Example 20, has a tinting strength of only 70 compared with standard white lead taken as 100. Furthermore such products with high content of lead sulphate have the advantage that they can be easily prepared by heating for shorter periods at lower temperatures.

The examples in Table II show the marked improvement in texture and tinting strength when lead sulphate is used in lead alumino-silicates containing larger amounts of silica. For comparison Example 16, Table II, is included, showing a lead alumino-silicate containing equal amounts of alumina and silica but no lead sulphate. The tabulation shows the effect on color and texture of successive heatings of the same sample and the high temperature finally required to make a white product though of poor texture and very low tinting strength. Comparison of time and temperature used in Example 16 with time and temperature shown in the other examples in Table II shows definitely the catalyzing or accelerating effect of the lead sulphate.

The following examples show the working of my process in greater detail. Example 17 shows a lead alumino-silicate which has been wet-milled and treated with water to form a hydrated product. Example 18 shows the preparation of lead alumino-silicate by using magnesium sulphate as the water-soluble sulphate. Example 19 shows the preparation of the mixture by dry-milling, with reaction to form lead sulphate taking place during the heating step. Example 20 shows one method of preparing a lead sulphate and its use by addition as such to the mixture of lead, aluminum and silicon compounds before heating to form lead alumino silicate in the solid phase. Example 21 shows the use of china clay in the application of the process.

*Example 17*

A mixture of 0.75 part of silica and 29 parts of aluminum hydrate $(Al(OH)_3)$, equivalent to 19.25 parts of alumina $(Al_2O_3)$, was first wet-milled as a thick slurry for 2 hours: 30 parts of lead oxide (PbO) were then added and milling continued 1 hour longer: 1.93 parts of 66 Bé. sulphuric acid were then added and milling continued for 2 hours longer. The mixture was then dewatered and dried.

The dry mixture was then calcined for 7 hours at 660 to 700° C.

Compositions of anhydrous pigment:

Lead oxide (PbO) _____ 50.34%  
Alumina _____ 37.40%  =89.20% lead alumino-silicate  
Silica _____ 1.46%  
Lead sulphate _____ 10.80%

The anhydrous pigment was wet-milled for 2 hours, remained in water for 9 hours and was then dried. The resulting hydrated product contained 1.48% combined water. The pigment had a very soft texture and tinting strength of 120 compared with standard white lead taken as 100.

*Example 18*

A mixture of 0.15 part of silica and 13.80 parts of aluminum hydrate $(Al(OH)_3)$, equivalent to 9.00 parts of alumina $(Al_2O_3)$, was wet-milled for 6 hours: 21 parts of lead oxide (PbO) were then added and milling continued for 1 hour longer: 3.06 parts of magnesium sulphate $(MgSO_4.7H_2O)$, equivalent to 1.50 parts $MgSO_4$, dissolved in 50 parts of water were then added and milling continued for 2 hours longer. The slurry was then dewatered and dried.

The dry mixture was calcined for 6 hours in the temperature range 750 to 810° C.

Composition of anhydrous pigment:

| | |
|---|---|
| Lead oxide (PbO) | 57.60% |
| Alumina | 28.40% = 86.50% lead alumino-silicate |
| Silica | 0.50% |
| Lead sulphate | 12.00% |
| Magnesium oxide | 1.50% |

The pigment had a very soft texture and a tinting strength of 140 compared with standard white lead taken as 100.

Example 19

A mixture of 0.45 part of silica, 40 parts of aluminum hydrate $(Al(OH)_3)$, equivalent to 26.55 parts of alumina $(Al_2O_3)$, and 4.36 parts of ammonium sulphate was dry-milled for 3 hours: 70.36 parts of lead oxide (PbO) were then added and the milling continued for 2 hours longer.

The mixture was then heated to 680° C. and then calcined 10 hours in the temperature range 680 to 710° C.

Composition of anhydrous pigment:

| | |
|---|---|
| Lead oxide (PbO) | 63.00% |
| Alumina | 26.55% = lead alumino-silicate |
| Silica | 0.45% |
| Lead sulphate | 10.00% |

The pigment had a soft texture and a tinting strength of 100, equal to that of standard white lead taken as 100.

Table I

| Example No. | Composition of pigment, per cent | Calcined, time, hrs., temp., ° C. | Color | Texture | Tinting strength, white lead standard = 100 |
|---|---|---|---|---|---|
| 1 | PbO 70.00 / Alumina 30.00 / Silica None / PbSO₄ None | 8 hours, 750 to 775 | White | Slightly granular | 100 |
| 2 | PbO 70.00 / Alumina 28.00 / Silica 2.00 / PbSO₄ None | 3 hours, 740 to 760 | do | Granular | 75 |
| 3 | PbO 59.70 / Alumina 29.20 / Silica None / PbSO₄ 11.10 | 6 hours, 730 to 750 | do | Soft | 125 |
| 4 | PbO 59.70 / Alumina 27.20 / Silica 2.00 / PbSO₄ 11.10 | 8 hours, 680 to 700 | do | do | 120 |
| 5 | PbO 66.50 / Alumina 28.00 / Silica 0.50 / PbSO₄ 5.00 | 4 hours, 700 to 760 | do | do | 115 |
| 6 | PbO 69.20 / Alumina 27.80 / Silica 2.00 / PbSO₄ 1.00 | 3 hours, 725 to 775 | do | do | 90 |
| 7 | PbO 58.00 / Alumina 22.40 / Silica 1.60 / PbSO₄ 20.00 | 4 hours, 675 to 725 | Cream white | do | 120 |
| 8 | PbO 42.00 / Alumina 16.80 / Silica 1.20 / PbSO₄ 40.00 | 1 hour, 700 to 720 | White | do | 115 |

Table II

| Example No. | Composition of pigment, per cent | Calcined, time, hrs., temp., ° C. | Color | Texture | Tinting strength, white lead standard = 100 |
|---|---|---|---|---|---|
| 9 | PbO 60.00 / Alumina 25.00 / Silica 5.00 / PbSO₄ 10.00 | 4 hours, 520 to 540 | Cream white | Soft | 150 |
| 10 | PbO 55.00 / Alumina 25.00 / Silica 10.00 / PbSO₄ 10.00 | 4 hours, 500 to 550 | do | Very soft | 130 |
| 11 | PbO 59.85 / Alumina 14.58 / Silica 14.57 / PbSO₄ 11.00 | 5 hours, 440 to 500 | do | do | 140 |
| 12 | Same as in Example 11. | 2 hours, 500 to 550 | White | do | 130 |
| 13 | Same as in Example 11. | ½ hour, 550 to 600 | Cream white | do | 125 |
| 14 | PbO 42.20 / Alumina 24.40 / Silica 24.40 / PbSO₄ 9.00 | 4 hours, 450 to 500 | White | Soft | 80 |
| 15 | Same as in Example 14. | 15 hours, 400 to 450 | Cream white | Very soft | 90 |
| 16 | PbO 67.20 / Alumina 16.40 / Silica 16.40 / PbSO₄ None | 5 hours at 440 to 500 / 2 hours longer at 500 to 550. / 1 hour longer at 550 to 600. / 4 hours longer at 650° C. / 1 hour longer at 700° C. / 1 hour longer at 700 to 770. | Bright yellow / do / do / Light yellow / Cream white / White | Soft / do / do / Granular / Very granular / do | — / — / — / — / — / 35 |

Example 20

A stock of normal lead sulphate, PbSO₄, was prepared by wet-milling, as a thick slurry, a mixture of 223 parts of lead oxide, PbO, and 132 parts of ammonium sulphate until the reaction to form lead sulphate was complete. The slurry was then dewatered and dried at 100° C.

The dry lead sulphate is a very fine white product having a soft texture—in such characteristics being fully equivalent to the lead sulphates of commerce which are prepared by precipitation or sublimation processes. The tinting strength of the lead sulphate prepared as described was 70 compared with Dutch process white lead standard of 100 tinting strength.

A mixture of 5 parts of the lead sulphate prepared as described, 35 parts of lead oxide, PbO, 21.4 parts of aluminum hydrate and 1 part of silica was wet-milled until thoroughly blended and then dried. The dry mixture was then calcined for 5 hours in the temperature range 740 to 780° C.

The pigment had a cream white color, soft fine texture and a tinting strength of 100 compared with standard white lead.

Example 21

66.7 parts of lead oxide, PbO, 37.4 parts of china clay, equivalent to 33.3 parts of anhydrous clay, and 5 parts of ammonium sulphate were wet-milled together for 1 hour and the slurry dewatered and dried. The dry mixture was calcined for 2 hours in the temperature range 500 to 550° C.

The resulting pigment had a cream white color, soft texture and a tinting strength of 110 compared with standard white lead taken as 100.

Example 22

A mixture of 0.4 part of silica and 8.6 parts of aluminum hydrate, equivalent to 5.6 parts of alumina (Al₂O₃), was first wet-milled as a thick slurry for 2 hours: 14 parts of lead oxide (PbO) were then added and the milling continued 1 hour longer: 0.0436 part of ammonium sulphate was then added to the slurry and the milling continued one-half hour longer. The mixture was then dewatered and dried. The dry mixture was then calcined for 3 hours in the temperature range 740 to 760° C.

The composition of the resulting pigment was:

|   | Per cent |
|---|---|
| Lead oxide (PbO) | 69.60 |
| Alumina | 27.90 |
| Silica | 2.00 |
| Lead sulphate | 0.50 |

The pigment had a soft texture and a tinting strength of 90 compared with standard white lead taken as 100.

Example 23

A mixture of 0.4 part of silica and 8.6 parts of aluminum hydrate, equivalent to 5.6 parts of alumina (Al₂O₃), was first wet-milled as a thick slurry for 2 hours: 14 parts of lead oxide (PbO) were then added and the milling continued 1 hour longer: 0.1744 part of ammonium sulphate was then added to the slurry and the milling continued one-half hour longer. The mixture was then dewatered and dried. The dry mixture was then calcined for 3 hours in the temperature range 740 to 760° C.

The composition of the resulting pigment was:

|   | Per cent |
|---|---|
| Lead oxide (PbO) | 68.18 |
| Alumina | 27.84 |
| Silica | 1.99 |
| Lead sulphate | 1.99 |

The pigment had a soft texture and a tinting strength of 105 compared with standard white lead taken as 100.

The physical properties of my lead alumino-sulphate pigments adapt them for application in oil, enamel, and lacquer type paints, and also for other purposes where white pigments are used, such as for rubber, linoleum and other floor coverings, printing ink, vitrified enamels, etc. An outstanding characteristic of my pigments is their capacity to impart durability to paint and therefore I have found them particularly applicable for use in exterior paints for the protection of both wood and metal surfaces.

I claim as my invention:

1. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in making an intimate mixture of lead sulphate and such lead, aluminum and silicon compounds as will upon heating supply to the pigment product respectively only lead oxide (PbO), alumina and silica, and then heating the mixture in the temperature range 400 to 850° C. until the said oxides chemically combine in the solid phase in the presence of lead sulphate to form said pigment.

2. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and a water-soluble sulphate, the solution of which will react completely with the lead compound to form lead sulphate, and then heating the mixture in the temperature range 400 to 850° C. until the said oxides chemically combine in the solid phase in the presence of lead sulphate to form said pigment.

3. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and a water-soluble sulphate selected from the group, sulphuric acid, ammonium sulphate and magnesium sulphate the solutions of which will react completely with the lead compound to form lead sulphate, and then heating the mixture in the temperature range 400 to 850°

C. until the said oxides chemically combine in the solid phase in the presence of lead sulphate to form said pigment.

4. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and sulphuric acid, which will react completely with the lead compound to form lead sulphate, and then heating the mixture in the temperature range 400 to 850° C. until the said oxides chemically combine in the solid phase in the presence of lead sulphate to form said pigment.

5. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and ammonium sulphate which will react completely with the lead compound to form lead sulphate, and then heating the mixture in the temperature range 400 to 850° C. until the said oxides chemically combine in the solid phase in the presence of lead sulphate to form said pigment.

6. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and magnesium sulphate which will react completely with the lead compound to form lead sulphate, and then heating the mixture in the temperature range 400 to 850° C. until the said oxides chemically combine in the solid phase in the presence of lead sulphate to form said pigment.

7. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately wet-mixing such lead, aluminum and silicon compounds as will upon heating supply to the pigment product respectively only lead oxide (PbO), alumina and silica and a water-soluble sulphate, the solution of which will react completely with the lead compound to form lead sulphate, and then heating the mixture in the temperature range 400 to 850° C. until the said oxides chemically combine in the solid phase in the presence of lead sulphate to form said pigment and finally treating the calcined pigment with water to hydrate same.

8. The method of making opaque white lead alumino-silicate pigments consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith, which consists in intimately dry-mixing a water-soluble sulphate from the group, sulphuric acid, ammonium sulphate and magnesium sulphate with such lead, aluminum and silicon compounds as will upon heating supply to the pigment product respectively only lead oxide (PbO), alumina and silica and then heating the mixture in the temperature range 400 to 850° C. to complete reaction of the water-soluble sulphate with the lead compound to form lead sulphate and chemical combination of said oxides in the solid phase to form said pigment.

9. In the process of making opaque white lead alumino-silicate pigments consisting preponderantly of chemically combined lead aluminum and silicon oxides the lead oxide being in excess of each of the ingredients alumina and silica, the sum of alumina and silica being not more than 55% of the total lead oxide, alumina and silica and 0.5 to 40% of lead sulphate associated therewith, which consists in making a mixture of materials which will supply to the product only the said ingredients and then heating the mixture in the temperature range 400 to 850° C. until the said oxides chemically combine in the solid phase, the step which consists in intimately incorporating lead sulphate in the said mixture prior to chemical combination of the said oxides in the solid phase.

10. In the process of making opaque white lead alumino-silicate pigments consisting preponderantly of chemically combined lead, aluminum and silicon oxides the lead oxide being in excess of each of the ingredients alumina and silica, the sum of the alumina and silica being not more than 55% of the total lead oxide, alumina and silica and 0.5 to 40% of lead sulphate associated therewith, which consists in making a mixture of materials which will supply to the product only the said ingredients and then heating the mixture in the temperature range 400 to 850° C. until the said oxides chemically combine in the solid phase, the step which consists in intimately incorporating lead sulphate by wet-mixing the lead, aluminum and silicon compounds with a water-soluble sulphate which will react completely with the lead compound to form lead sulphate prior to chemical combination of said oxides in the solid phase.

11. In the process of making opaque white lead alumino-silicate pigments consisting preponderantly of chemically combined lead, aluminum and silicon oxides the lead oxide being in excess of each of the ingredients alumina and silica, the sum of the alumina and silica being not more than 55% of the total lead oxide, alumina and silica and 0.5 to 40% of lead sulphate associated therewith, which consists in making a mixture of materials which will supply to the product only the said ingredients and then heating the mixture in the temperature range 400 to 850° C. until the said oxides chemically combine in the solid phase, the step which consists in intimately incorporating lead sulphate by dry-mixing the lead, aluminum and silicon compounds with a water-soluble sulphate which will react completely with the lead compound to form lead sulphate prior to chemical combination of the said oxides in the solid phase.

12. An opaque white lead alumino-silicate pigment consisting preponderantly of chemically combined lead oxide (PbO), alumina and silica, the lead oxide being in excess of each of the ingredients alumina and silica, the sum of the alumina and silica being not more than 55% of the total lead oxide, alumina and silica, and 0.5 to 40% of lead sulphate associated therewith.

13. An opaque white hydrated lead alumino-silicate pigment consisting preponderantly of chemically combined lead oxide (PbO), alumina and silica the lead oxide being in excess of each of the ingredients alumina and silica, the sum of the alumina and silica being not more than 55% of the total lead oxide, alumina and silica and 0.5 to 40% of lead sulphate associated therewith.

LOUIS E. BARTON.